UNITED STATES PATENT OFFICE.

MAX CONRAD, OF ASCHAFFENBURG, GERMANY, ASSIGNOR TO THE FIRM OF E. MERCK, OF DARMSTADT, GERMANY.

PROCESS OF MANUFACTURING DIALKYLBARBITURIC ACID.

No. 856,622.     Specification of Letters Patent.     Patented June 11, 1907.

Original application filed November 8, 1904, Serial No. 231,871. Divided and this application filed July 13, 1906. Serial No. 326,038.

*To all whom it may concern:*

Be it known that I, MAX CONRAD, a subject of the Emperor of Germany, residing at Aschaffenburg, in the Empire of Germany, have invented certain new and useful Improvements in the Process of Manufacturing Dialkylbarbituric Acid, of which the following is a description.

My invention relates to the manufacture of dialkylamid compounds and dialkylbarbituric acids therefrom and consists in first reacting upon dialkylmalonaminacid ester with thiourea in the presence of alkalin condensing agents, removing the alcohol in a suitable manner such as distillation, decomposing the residue with acid to form dialkylthiobarbituric acid, and in converting the latter by usual methods to dialkylbarbituric acid.

According to the experiments made by Emil Fischer and Alfred Dilthey (*Berlin Reports* 35 (1902), page 844) the dialkylmalonamids and the dialkylmalonamin-acid ester cannot practically be obtained from dialkylmalonacid esters and the ammonium salts of the dialkylmalonacids cannot be converted into amids. According to the above authorities, the only way to accomplish the result sought is by means of the chlorids of acid. I have discovered, however, a convenient and smooth method of manufacturing dialkylmalonylamid compounds. This method consists in moderately heating the cyandialkylacetamids, the cyandialkylacetylurea, or the cyandialkylacetic ester, with concentrated acids. In this way the cyandialkylacetamids are converted to dialkylmalondiamids the cyandialkylacetylurea is converted to dialkylmalonamin urea and the cyandialkylacetic ester to dialkylmalonaminacid ester. These dialkylmalonamid compounds can be converted in the same manner as the dialkylmalonacid ester with thiourea into dialkylthiobarbituric acids, under the action of the same condensating means, viz., the alcoholates of alkali—or earthy metals themselves or the amides thereof.

I will now describe the manner in which I at present prefer to practice my invention, giving, by way of illustration, an example thereof, but it will be understood that various modifications and changes, both as to materials and treatment, may be made without departing from the spirit of my invention and without exceeding the scope of my claim.

Example. From the cyandiethylacetic ester, the diethylmalonaminacid ester

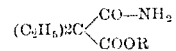

is obtained as above in colorless prisms, which melt at 79° and can be easily dissolved, especially with warmth, in ether, spirit, acetic ether and benzol. The ester boils to a large extent at 263° (uncorr.). In order to obtain diethylthiobarbituric acid therefrom, 60 grams of sodium are dissolved in 4 liters of absolute alcohol and to this hot solution 200 grams of thiourea and 470 grams of diethylmalonaminacid ester are added. The mixture is heated for several hours in the water-bath and the alcohol is then removed by distillation. The solid residue is dissolved in water and is decomposed by adding an acid such as acetic acid or hydrochloric acid until the mixture reacts acid toward litmus. The diethylthiobarbituric acid is filtered off and recrystallized from boiling water. In this way, 350 grams of diethylthiobarbituric acid are obtained. The same melts at 175° C. and can be easily converted into diethylbarbituric acid by oxidizing means (*e. g.* by means of nitric acid), or by means of metallic oxids, as lead-oxid.

I suppose that the reactions involved in this process are represented by the following equations:

1. 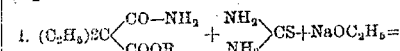

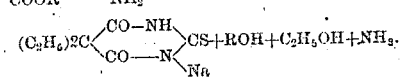

2. 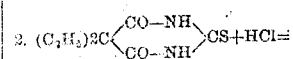

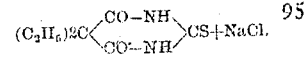

This application is filed as a division of my application No. 231871 filed November 8, 1904, for the purpose of claiming another species of process coming under the generic claims of said application.

Having thus fully described my invention, what I claim and desire to secure by Letters Patent is:—

1. The process of manufacturing a dialkylbarbituric acid, which consists in condensing a dialkylmalonylamid compound with thiourea by means of an alkaline condensing agent into a dialkylmalonylthiourea and then converting the latter into a dialkylbarbituric acid by means of an agent substituting oxygen for sulfur.

2. The process of manufacturing diethylbarbituric acid, which consists in condensing a diethylmalonaminacid ester with thiourea by sodium alcoholate into diethylmalonylthiourea, and then converting the latter by an oxidizing agent into diethylbarbituric acid.

In testimony whereof, I have hereunto signed my name in the presence of two subscribing witnesses.

MAX CONRAD.

Witnesses:
 JEAN GRUND,
 CARL GRUND.